P. A. Dormoy.
Mach. for Puddling Iron.
Nº 90,158. Patented May 18, 1869.
Sheet 1. 7 Sheets.
Fig. 1.
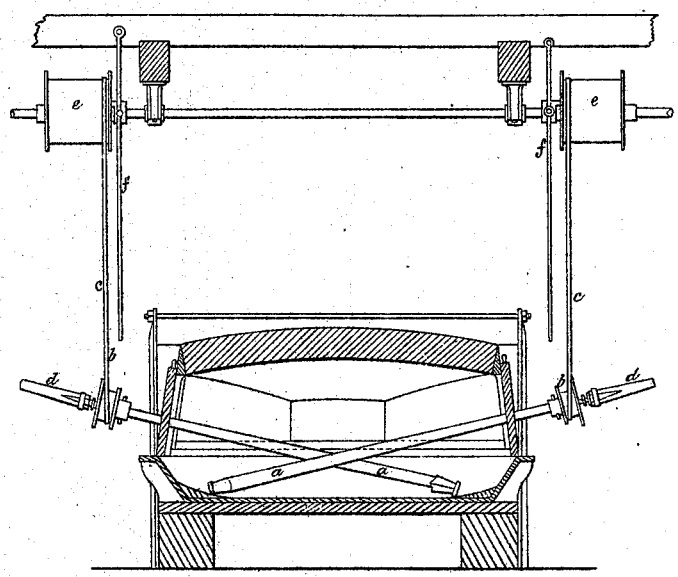
Fig. 3.
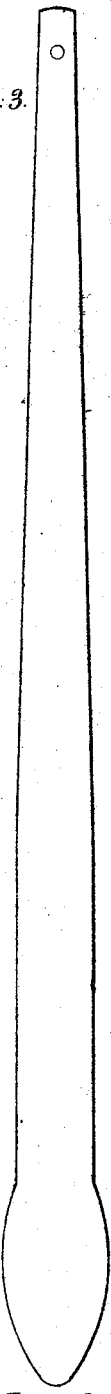
Fig. 2. Fig. 4.
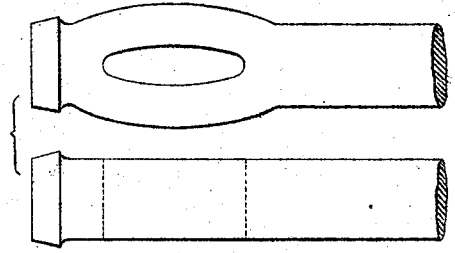
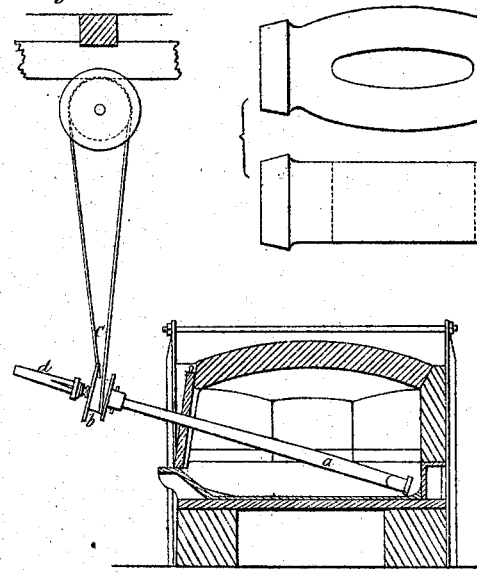
Fig. 5.
Witnesses
H. S. Miller
Jno D Patten
Inventor
P. Adolph Dormoy
By D. A. Burr
att.

P. A. Dormoy.
Mach. for Puddling Iron.
N° 90,158. Patented May 18, 1869.
Sheet 2. 7 Sheets.
Fig. 6.
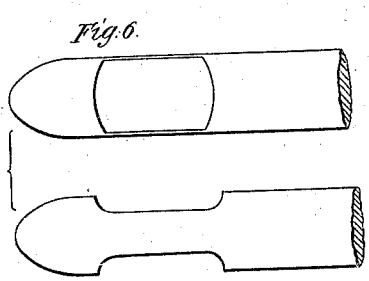
Fig. 8.
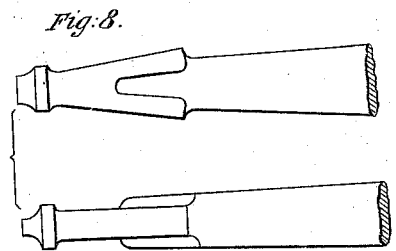
Fig. 7.
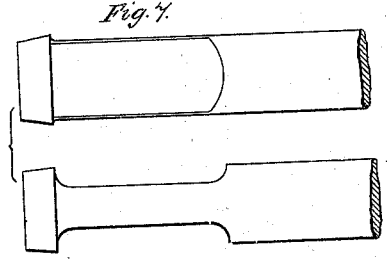
Fig. 9.
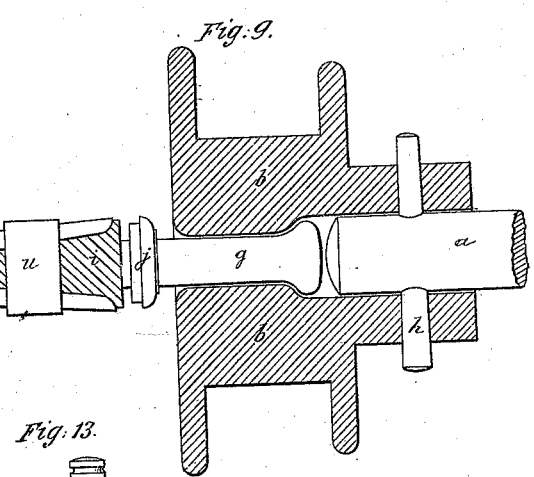
Fig. 10.
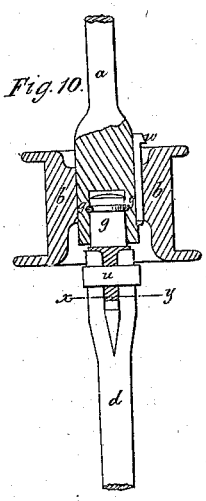
Fig. 12.
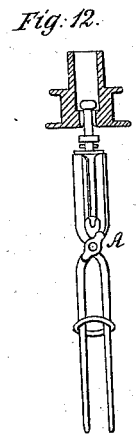
Fig. 13.
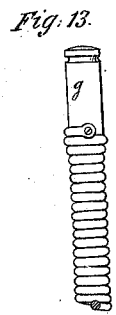
Fig. 16.
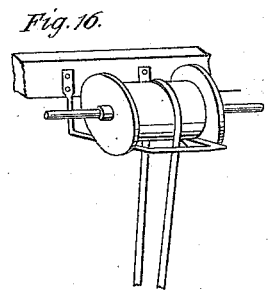
Fig. 14.
Fig. 15.
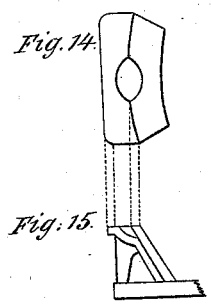
Fig. 11.
Witnesses.
H. S. Miller
Jno O Patten
Inventor.
Pierre A. Dormoy
By DaBur
atty P. A. Dormoy.
Mach. for Puddling Iron.
Nº 90,158. Patented May 18, 1869.

P. A. Dormoy.
Mach. for Puddling Iron.
N°. 90,158. Patented May 18, 1869.
Fig. 20.
Fig. 21.
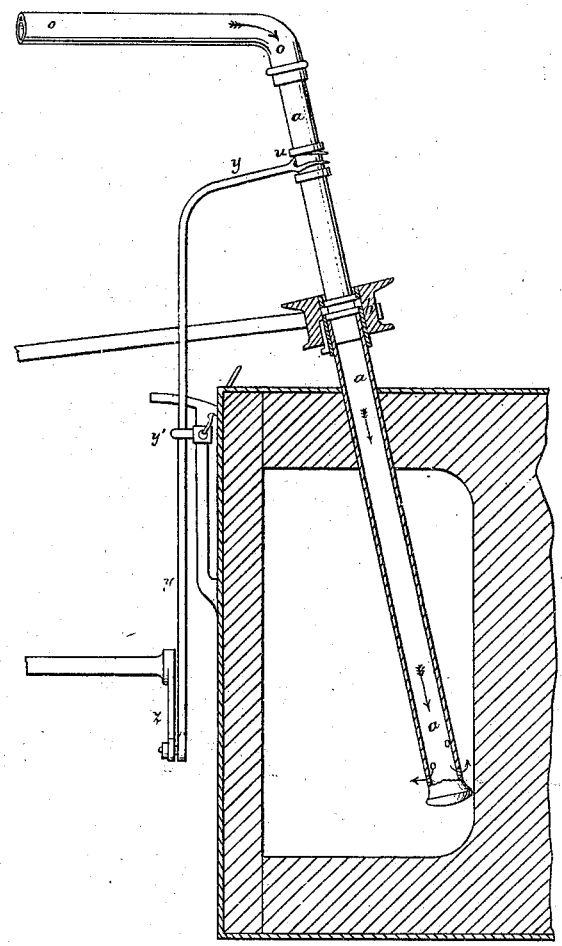
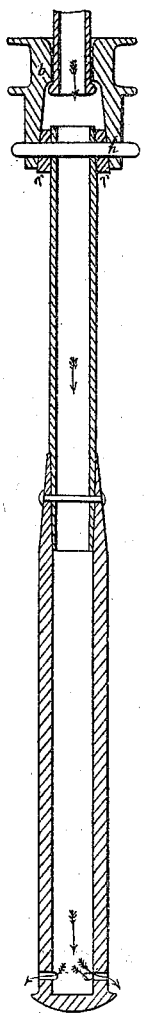
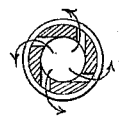
Witnesses.
N S Miller
Jno D Patten
Inventor.
Pierre A. Dormoy
By DaBurr
atty

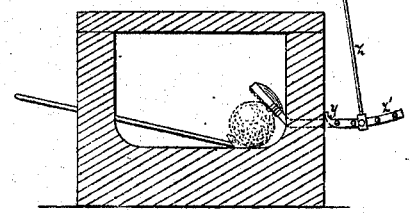
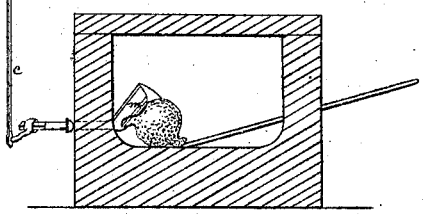
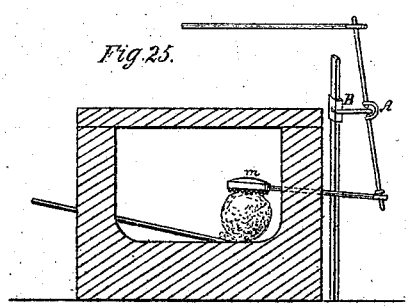
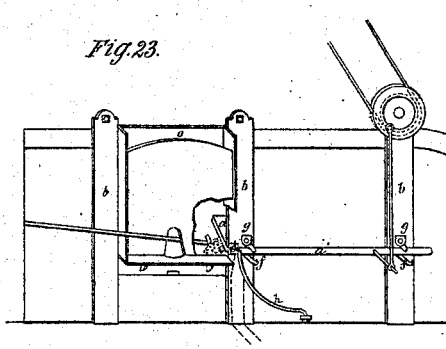
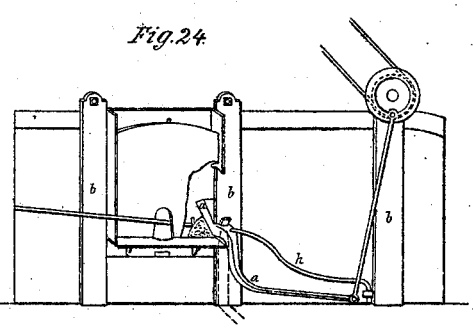
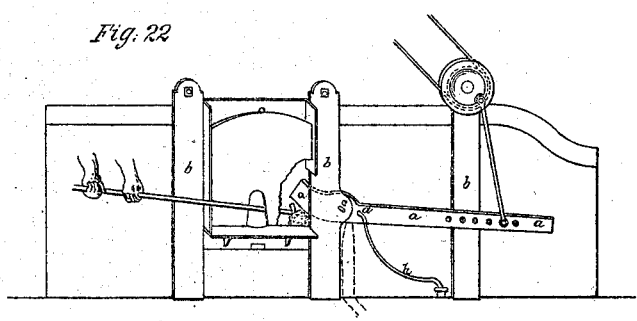

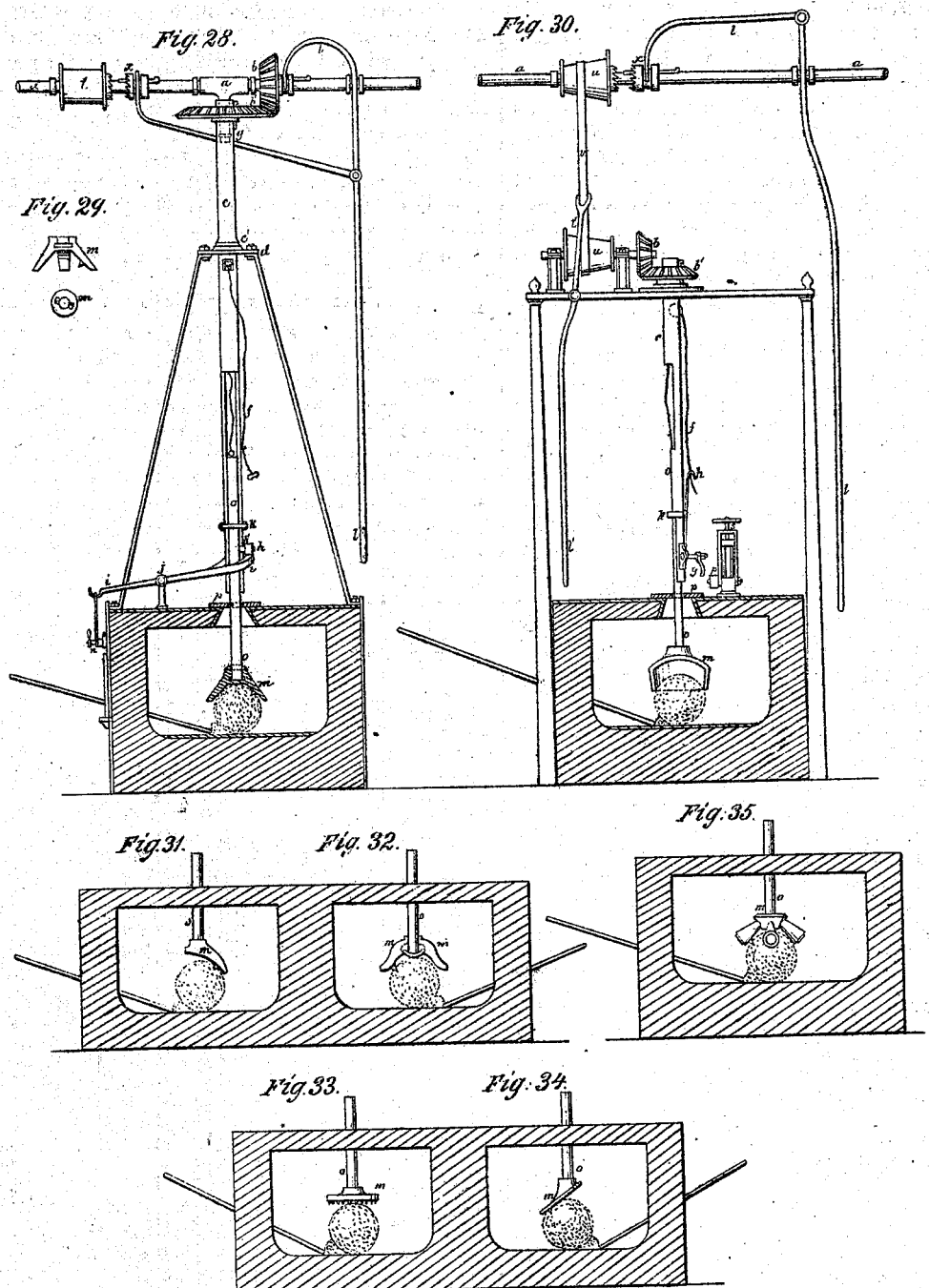

UNITED STATES PATENT OFFICE.

PIERRE A. DORMOY, OF VIENNA, AUSTRIA.

IMPROVED APPARATUS AND MACHINERY FOR PUDDLING IRON.

Specification forming part of Letters Patent No. 90,158, dated May 18, 1869.

*To all whom it may concern:*

Be it known that I, PIERRE A. DORMOY, a citizen of France, resident in Vienna, Austria, have invented a new Process for Mechanical and Manual Puddling, by means of rotating and oscillating instruments; and I do hereby declare that the following is a full and exact description thereof, reference being had to the accompanying drawings, and to the letters of reference marked thereon.

This invention relates to instruments or tools to be employed in the puddling-furnaces, and to apparatus for imparting mechanical motion to the same; the one class of these tools being employed for the purpose of puddling, rabbling, or refining, and being made to rotate by machinery, and being guided about in the furnace by manual or mechanical means, while the other class of tools is employed for forming or squeezing the blooms in the puddling-furnace, and receives either an oscillating or rotating motion by mechanical means.

On the double sheet I, of the accompanying drawings, Figures 1 and 2 represent sections of furnaces supplied with tools rotating by machinery but capable of being guided by hand. Fig. 3 shows a tool in its entire length, on an increased scale, and Figs. 4, 5, 6, 7, and 8 show the different-shaped ends. Figs. 9, 10, 11, 12, 13, show different arrangements, on different scales, of the pulleys and handles to these tools. Fig. 14 is a view from above, and Fig. 15 a section of the door-sill of the puddling-furnace. Fig. 16 shows an arrangement for preventing the straps from slipping off the drums.

On the single sheet II, Fig. 17 shows a furnace, partly in section, with two rotating puddling-tools, guided by hand and working from the side, and another tool, rotating mechanically from above. Figs. 18 show other differently-shaped tool-ends which may be employed.

On the single sheet III, Fig. 19 shows an arrangement for mechanically turning about a tool inserted into the furnace from above.

On the single sheet IV, Fig. 20 shows a section of a furnace, with a hollow tubular tool, to be rotated and guided by mechanical means, and Fig. 21 represents another description of hollow tubular tools.

On the double sheet V are shown means for mechanically forming and squeezing blooms in the puddling-furnace, by aid of tools working vertically from above, and capable of being mechanically rotated, and also raised or depressed.

On the double sheet VI are shown different arrangements for squeezing the blooms in the puddling-furnace, by means of oscillating tools introduced through an opening in the side of the furnace.

The first part of my invention consists in imparting, mechanically, rotary motion on their axes, at any desirable speed, to tools, which the puddler at the same time directs by hand, in the metal in a state of fusion in the puddling-furnace, so as to forcibly agitate the metal in all required directions. The ends of the tools which enter the metal may be of any desirable form—round, square, flat, oval, or eccentric—and arranged so as to agitate the metal more or less, as required. The tool may be rotated either vertically, obliquely, or horizontally; or from right to left, or from left to right, or alternately in both directions. In carrying out this part of my invention, I fit on the shaft of the tool a pulley, round which a driving strap, band, chain, or cord is passed from a drum, and a handle is fitted into the other end of the pulley in such a way as not to rotate with it. While the driving-strap imparts rotation to the tool, the puddler, by means of the handle, directs the working end of the tool to any part of the furnace, as required, in order to agitate the molten metal throughout. Any desirable number of tools may be employed in each furnace, and the speed at which they are driven may be very great, but from three hundred to four hundred revolutions per minute may be taken as a general average.

Figs. 1 and 2, on sheet I, and Fig. 17, on sheet II, of the accompanying drawings, are sections of furnaces with these rotating puddling-tools applied thereto. *a* is the tool, on the shaft of which a pulley, *b*, is fitted. *c* is a band, passed round the pulley from a drum, *e*. *f* is an arrangement for throwing the drum into and out of action by means of a lever fixed to a sliding roller having a projecting tooth upon it, which catches against another projecting tooth on the drum e, and so carries the latter round, whether it rotates in the one or the other direction. Different constructions of the handles and pulleys are shown in Figs. 9, 10, 11, 12, and 13. The handles are always constructed so as to diminish as much as possible the vibration in the hands of the workman produced by the rotation of the tool. In Fig. 9, $a$ is the tool, held in the pulley $b$ by the pin $h$. $g$ is the part of the handle inserted into the pulley, and provided with a collar, $j$, to keep it from being pushed too far into the pulley, while, in order to diminish the vibration, an india-rubber ring, $i$, lies between the part of the handle $g$ and the proper handle $d$, which is held fast over the india-rubber by means of the ring $u$. This ring $i$ may also be made of cork, leather, hemp, or any other more or less elastic substance, tending to diminish the vibration.

In Fig. 12, the clip $d$, with its ring $u$, is replaced by a pair of tongs. Fig. 10 shows another modification of pulley and handle, in which the end of the tool is fixed into the pulley by means of the key $w$, while the part of the handle $g$ is inserted into the end of the tool and held there, as shown by means of the pins $z\ z$, in such a way as not to rotate with it. The other parts are the same as in Fig. 9. Fig. 11 represents a section through the line $x\ y$ of the Fig. 10, showing the other handle, the india-rubber ring, and the inner handle. Fig. 13 shows another way of diminishing the frictional vibration, by fixing a strong spiral spring as intermediate handle to the other part.

The ends of the tools may be of all kinds of shapes, according to the consistency and the character of the iron. Different shapes are shown in the figures 3, 4, 5, 6, 7, and 8, on Sheet I, and in the figures 18 on Sheet II.

In puddling gray and highly-carbureted iron, I prefer to use for the commencement rabbling-tools of the shapes shown by Figs. 3, 6, and 7, which do not agitate the iron too violently, while for white pig-iron, which is inclined to boil very soon, I prefer to use the tool shown in Fig. 3, which agitates the metal the least. On the other hand, when the iron forms grains and begins to agglomerate, and also for cutting up the blooms, I prefer to use a bladed tool like that shown in Fig. 8.

Figs. 14 and 15 show a view and section of a door-sill for the puddling-furnace, which is so formed that the tool should not rub against it during the working.

Fig. 16 shows a simple arrangement, consisting in an iron guide or fence, to prevent the strap from jumping off the drum, as the cheeks of the drum are often not sufficient protection against this.

Figure 17:
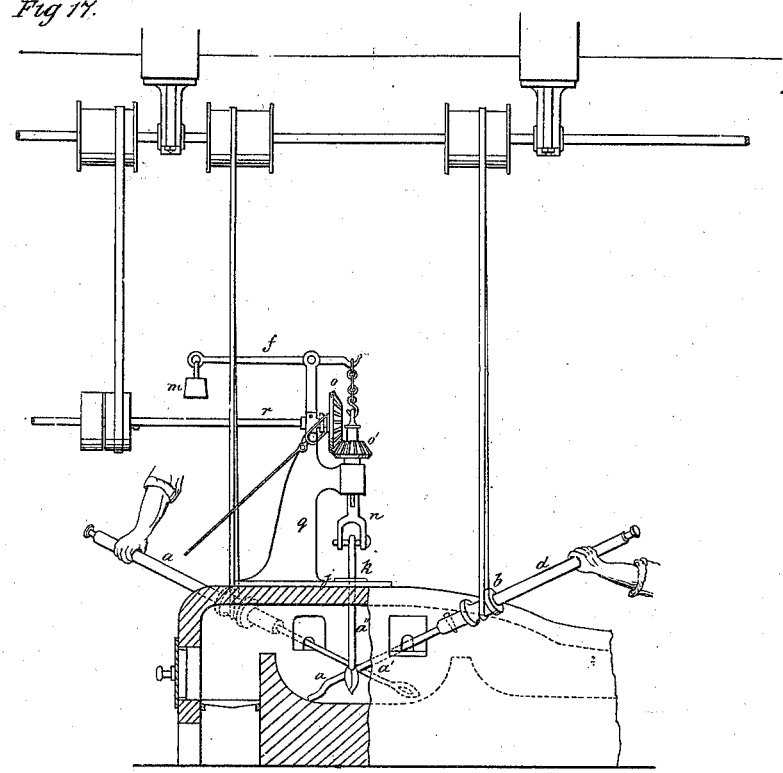
Figure 18:
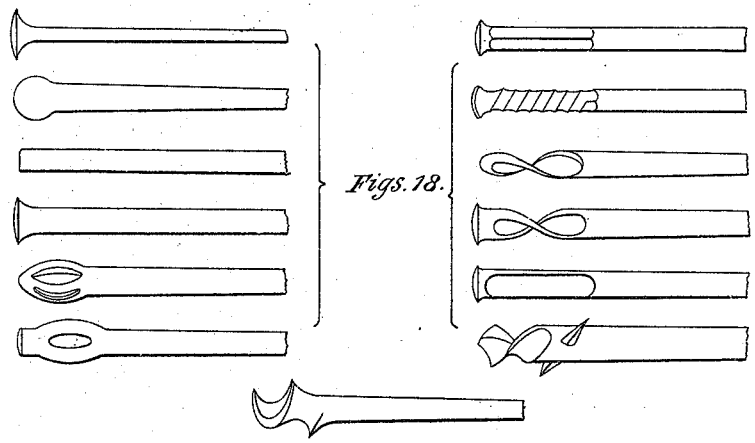

In some cases, in addition or not to the employment of tools driven from drums and directed by hand as before explained, I employ tools actuated as represented in Fig. 17. Upon a plate, $j$, on the top of the furnace, I mount a frame or bracket, $q$. On the plate $j$ there is a conical opening passing through, and at the middle of the roof of the furnace. The opening is wider at the lower end, to allow of the inclination of the tool $a''$, which is passed through it. The opening during the puddling is closed by a sliding plate, $k$, on the frame-plate $j$, and through which the tool also passes, so that the sliding plate moves according to the direction of the tool. Upon the frame or bracket $q$ a lever, $f$, is pivoted. One end is weighted at $m$, and the other end has suspended therefrom a chain connected to a forked carrier, $n\ n'$, for the tool. In this manner the weight of the tool and carrier is equalized. The tool-carrier is rotated by bevel-gearing $o\ o'$, moved by a shaft, $r$, which is supported by the bracket $q$, and carries a drum, round which a driving-band is passed. In this Fig. 17 two other tools, rotating by machinery, but guided by hand, are also shown.

Figure 19:
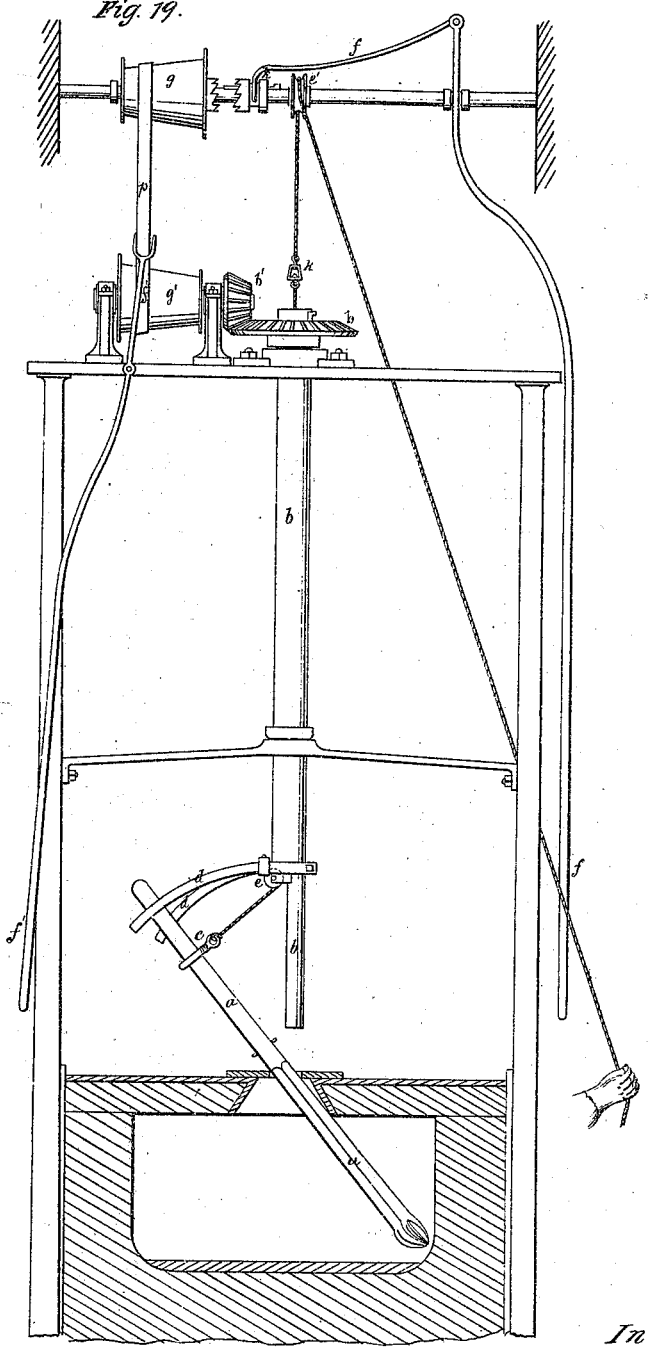

Fig. 19 shows another system of actuating tools in a puddling-furnace. $a$ is the puddling-tool, passing through the roof of the furnace. Its outer end is held by the ring $c$ and guided by a fork, $d$, fixed to the hollow shaft $b$. The ring $c$ is fastened to a chain, which passes over a pulley, $e$, on the shaft $b$, and then, after going through this hollow tubular shaft, ends in the swivel $k$, which allows it to turn without communicating its motion to the other chain attached above the swivel $k$. This latter part of the chain goes over the pulley $e'$, and hangs down close to the workman, so that he has only to pull this chain to make this position of the puddling-tool more or less inclined, and accordingly make it describe smaller or larger circles or spirals on the bottom of the puddling-furnace. The hollow shaft $b$, which, by means of the fork $d$, communicates its motion to the tool, is worked by the cones $g\ g'$ communicating with the driving-gear $h\ h'$. The cone $g$ is put into or out of motion by means of the coupling-clutch $p$, worked by the lever $f$. The lever $f'$, which commands the strap $p$, serves to accelerate or diminish the speed of the cone $g'$, by being moved either from the right to the left or from the left to the right.

These rotating tools may also be formed hollow, so as to serve at the same time for injecting air, steam, or gases. Thus, Fig. 20 shows a hollow rotating tool, $d$, of this description, as well as also an automatic mode of moving the tool about to all parts of the furnace. A ring, $u$, fixed to the tube $a$, is held by the forked end of a lever, $y$, to which motion is given by means of the eccentric $z$.

The lever $y$ passes through a rest, $y'$, which serves as a pivot, and the curves described by the tool in the furnace through the action of the eccentric $z$ may be varied by altering the position of the pivot. Thus the tool, independently of its rotative movement, receives also a motion, bringing it into the different parts of the furnace, solely by means of the eccentric lever. By this arrangement, therefore, a kind of tuyère, moving about in the midst of the molten metal, is obtained, which has the remarkable property of simultaneously twirling, stirring, and blowing into the iron, all by mechanical means.

Fig. 21 shows another description of hollow tool for injecting air, steam, or gases, during its rotation, and which may be guided either by hand or by machinery. The lower part of this tool is made separate, so as to be easily replaced when burned. $r$ is an india-rubber ring closing the orifice round the part connecting the working tool with the pulley. Sometimes, instead of making an entire tool hollow and injecting the air or gases, I merely make the end of tool that comes under the molten iron hollow, and insert into this part a piece of wood, which rapidly disengages gases; or I can insert into this hollow end of the tool any other substances which disengage gases, when in contact with the molten metal during the rotation of the tool.

Another part of my invention has for its object the formation of blooms or balls in the puddling-furnace by a combination of mechanical and manual actions.

The process for forming and squeezing the blooms to which I give the preference consists in placing the mechanical compressing-tool close to the working door—that is to say, on the same side that the working puddlers ordinarily compress the iron to form the blooms. The result is that no change need be made in the ordinary work of the puddler, and one obtains a bloom of iron or steel well squeezed by a double action of squeezing, simultaneously, mechanically and by hand.

The three figures, 22, 23, 24 show different oscillating squeezers, which compress the blooms of iron in the puddling-furnace, like the ordinary great shingling-squeezers.

Fig. 22 represents an oscillating squeezer, $d$, placed at the long side of the furnace, and penetrating into the same next to the upright $b$, against which it is supported by means of the pin $c$, which acts as axis, and is removed when the squeezer has to be taken out of the furnace. The part entering into the furnace may be of steel, wrought-iron, or cast-iron, and is hollow, in order to admit of its being cooled by a stream of water, air, or steam, which can be introduced through an opening, $d$, in one of the sides, another opening allowing it to escape. This process of cooling the compressing-tools has the great advantage of allowing the work to be continued for any length of time, in the most intense heat, without fear of burning the tools, as well as the advantage of enabling the tool to be used for closing the opening through which it was introduced, by simply drawing it back to its orifice, without fear of its being burnt. This opening should only be just large enough to allow of the introduction of the tool and of its oscillation, in order to prevent, as much as possible, the entering of air during the work.

The squeezing utensils may be of any dimensions, provided they be only strong enough to withstand the force required to compress the blooms. They may be put in motion by all kinds of mechanical means producing any oscillating movement, either horizontal, or vertical, or oblique, by means of eccentrics, cams, levers, &c.

The working apparatus may be placed on the ground or above the furnace, but, preferably, so as to impede the workmen as little as possible. In work in which the furnaces are in one line one single bar, oscillating horizontally transverse to the furnaces, may serve to give an oscillating movement to the squeezers of each furnace.

Fig. 23 shows an oscillating compressing utensil or tool, $a$, fixed on a transverse shaft, $a'$, placed horizontally at the height of the door-sill, and supported on two projections, $f$, fixed in each of the uprights $b$. These two projecting bars are bent at their ends, to prevent the squeezing-tools from falling off from the furnaces.

The two bent catches G G, placed above the horizontal shaft of the utensil or tool, serve to hold the same, and prevent it from being raised by the effort exerted in squeezing the bloom. These catches are movable, and are held to the uprights $b$ by means of small pins, which serve as pivots, so that they can be turned aside to remove the tool from the furnace. The tubes H serve to conduct water, steam, or cold blast to cool the squeezers, and are of india-rubber or other flexible material, so as to be able to follow the movements of the tools to which they are fixed.

Fig. 24 shows a squeezing-tool, $a$, having its fulcrum, when in action, against the upper part of an opening in the upright $b$, a projection on the upper part of the tool serving to maintain it in its position. The oscillating movement of the end in the puddling-furnace is produced by raising and depressing, mechanically, the tail of the tool, which descends down to the ground in front of the upright, and which is curved, so as not to be in the way of the workmen.

Figs. 25, 26, 27 are variations of the system illustrated in Figs. 22, 23, and 24. Fig. 25 represents an oscillating disk, which can also be turned about horizontally, so as to describe a curve above the hearth-bottom. According to the required size of the blooms, the position of the disk $m$ may be changed, by displacing the support B. Fig. 26 shows an inclined disk, with a flat or hollowed surface, the rim being jagged or indented. The disk $m$ compresses the metal while simultaneously turning the bloom round, and is put into action by means of the arm $y$, which, while pressing against the door of the furnace, partly draws back the disk. This motion can be regulated by means of the connecting-rod $z$, which can be displaced along the lever $z'$, thereby increasing or decreasing the length of its course. Fig. 27 shows a squeezer, $r$, of curved, mold-like shape, and capable of oscillating in any direction.

The following mechanical means for forming and squeezing the blooms work according to the same principle, but in a somewhat different way.

Fig. 28 shows the interior of a furnace, in which a bloom is being formed by means of a vertical tool, $o$, at the lower end of which the contrivance $m$ is fixed, (shown in detail in Fig. 29,) which participates in the rotating and ascending movements of the tool $o$. The shaft $a$ drives the pinions $b\ b'$, the latter being mounted on the vertical axle $c$, guided and supported by the part $e$, by means of the two pins $g\ g$. The pinion $b$, and, consequently, the shaft $c$, may be put into or out of motion by means of the lever $l$. By means of this lever the coupling-clutch $x$ may be made to approach or recede from the drum $t$, fixed on the shaft $d$, and serving, also, to give motion to the puddling or rabbling tool introduced into the furnace by the door. $f$ is a chain, for extracting the tool $o$, held to the shaft $c$ by a collar, $k$. A roller, $h'$, facilitates the raising or depressing the tool in the interior of the shaft $c$. Another roller, $h$, runs along an inclined helicoidal plane, $i$, for the purpose of raising or sinking the tool $o$. This inclined plane, pivoting in $j$, may be moved vertically by means of the ratchet-wheel $n$, round which a cord runs. $p$ is a metal plate, lying on the top of the furnace, and capable of being raised at will.

Fig. 30 represents a tool, $o$, with the working end $m$ shaped like a conical mold, and provided, like the already-described squeezer, with a tooth or point to hold and turn the bloom. $h$ is a hook, to hold back the chain $f$. The intermittent compression of the bloom can be performed, at the will of the workman, by means of a piece, $g$, fixed to the axis $c$. This piece encounters, during the rotation of the tool, a roller, $r$, which can be raised or lowered by means of a screw, $s$, according to the height of which the impact on the bloom will be more or less violent. $u\ u'$ are the cones by which the apparatus is set in motion. By means of the lever $l'$, acting on the belt $v$, the speed of the cone $u'$, and, consequently, of the tool $o$, may be accelerated or diminished.

Fig. 31 shows a tool, $o$, with a working end, $m$, of a curved and inclined shape.

Fig. 32 shows a tool, with a working end, $m$, with movable arms, pivoting on a ring or collar fixed at the end, and round the axis $o$.

Fig. 33 shows the substitution of the above-described working ends and molds by a simple disk, $m$, either flat or concave, with a toothed or indented rim. The compression is executed by means of one of the above-described combinations.

Fig. 34 shows an arrangement with an inclined disk turning obliquely, and describing an eccentric curve.

Fig. 35, finally, shows an arrangement with an inclined set of arms, and is a variation of Figs. 28 and 29. The arms or branches which compose the working-end $m$ are of the number 4, 6, 8, more or less. Each of the arms bears a roller, which can rotate in either direction, the only exception being the arm provided with a point or tooth for holding, raising, and turning the bloom. By this apparatus, therefore, the bloom is compressed, enlarged, and rounded off in the same way as by the operations and apparatus already described.

In these operations for forming and squeezing the bloom, therefore, the workman has every facility given him for introducing additional iron from below to the bloom during the working operation, and of thus enlarging it and giving it a round shape, until it has attained the size and form desired, when it can be removed from the puddling-furnace in the usual way, to be shingled and forged by the means ordinarily in use.

And, having now described the nature of the said invention, and in what manner the same is to be performed, I declare that I claim—

1. The mode of puddling, substantially as hereinbefore described—that is to say, by means of tools to which rotary motion on their axes is imparted mechanically, while they are, at the same time, directed by the puddler to any required part of the furnace.

2. Constructing apparatus for imparting rotary motion to puddling-tools, substantially as hereinbefore described, and represented in the accompanying drawings.

3. Constructing tools to be employed in puddling with a handle which will allow the tool-shaft to rotate while the handle is held by the puddler, substantially as hereinbefore described, and represented in the accompanying drawings.

4. The employment of hollow rotating tools as a means for injecting air, steam, or other gases into the molten iron during the puddling, and the constructing of the same, substantially as hereinbefore described and represented in the accompanying drawings, whereby I would have it understood that what I claim as my invention is not simply the injection of air, steam, or gases, by means of puddling-tools, as already known, but the employment for that purpose of tools rotating, as described, simultaneously with the injection of air, steam, or other gases.

5. The mode of compressing and forming the blooms in the puddling-furnace, by means of oscillating tools cooled by an internal stream of water, air, or steam, substantially as hereinbefore described, and represented in the accompanying drawings.

6. The mode of compressing and forming the blooms in the puddling-furnace, by means of tools introduced into the furnace from above, and rotating, rising, and sinking, substantially as hereinbefore described, and represented in the accompanying drawings.

7. Constructing apparatus for imparting oscillating or rotating and rising and sinking motion to tools for forming and compressing blooms in the puddling-furnace, substantially as hereinbefore described, and represented in the accompanying drawings.

AHE. DORMOY.

Witnesses:
DAVID A. BURR,
WM. H. ROWE.